US012749423B2

(12) United States Patent
Takai

(10) Patent No.: US 12,749,423 B2
(45) Date of Patent: Sep. 29, 2026

(54) INFORMATION PROCESSING APPARATUS AND IMAGE FORMING APPARATUS THAT PERFORM DISPLAY CONTROL FOR DISPLAY DEVICE

(71) Applicant: KYOCERA Document Solutions Inc., Osaka (JP)

(72) Inventor: Kenji Takai, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 104 days.

(21) Appl. No.: 18/766,655

(22) Filed: Jul. 9, 2024

(65) Prior Publication Data

US 2025/0029539 A1 Jan. 23, 2025

(30) Foreign Application Priority Data

Jul. 19, 2023 (JP) ................................ 2023-117894

(51) Int. Cl.
*G09G 3/20* (2006.01)
*H04N 1/00* (2006.01)

(52) U.S. Cl.
CPC ....... *G09G 3/2092* (2013.01); *H04N 1/00408* (2013.01); *H04N 1/00496* (2013.01); *G09G 2340/0492* (2013.01); *H04N 2201/0094* (2013.01)

(58) Field of Classification Search
CPC ......... G09G 3/2092; G09G 2340/0492; H04N 1/00408; H04N 1/00496; H04N 2201/0094
See application file for complete search history.

(56) References Cited

U.S. PATENT DOCUMENTS

| | | | | |
|---|---|---|---|---|
| 5,134,390 A * | 7/1992 | Kishimoto | ............ | G06F 1/1601 348/836 |
| 10,542,194 B2 * | 1/2020 | Hamada | ................. | G03B 17/20 |
| 2024/0056533 A1 * | 2/2024 | Kamoi | ............... | H04N 1/00074 |

FOREIGN PATENT DOCUMENTS

| | | |
|---|---|---|
| JP | H07306582 A | 11/1995 |
| JP | H0899742 A | 4/1996 |
| JP | 2021100210 A | 7/2021 |

* cited by examiner

*Primary Examiner* — Tat C Chio
(74) *Attorney, Agent, or Firm* — IP Business Solutions, LLC.

(57) ABSTRACT

An image forming apparatus includes: a display device with a rectangular shape having long sides and short sides; a rotation mechanism causing the display device to be rotatable between a landscape orientation with the long sides located on upper and lower sides and a portrait orientation with the short sides located on the upper and lower sides; a detection sensor detecting which of landscape and portrait orientations the display device is in; and a controller displaying an error screen including a concept image and a text indicating details of an error on the display device. The controller arranges first and second display regions on the error screen, and horizontally arranges the first and second display regions when the detection sensor detects the landscape orientation of the display device, or vertically arranges the first and second display regions when the detection sensor detects the portrait orientation of the display device.

6 Claims, 10 Drawing Sheets

47
473
LANDSCAPE ORIENTATION

PORTRAIT ORIENTATION

LANDSCAPE ORIENTATION

INFORMATION PROCESSING APPARATUS AND IMAGE FORMING APPARATUS THAT PERFORM DISPLAY CONTROL FOR DISPLAY DEVICE

INCORPORATION BY REFERENCE

This application claims priority to Japanese Patent Application No. 2023-117894 filed on Jul. 19, 2023, the entire contents of which are incorporated by reference herein.

BACKGROUND

The present disclosure relates to an information processing apparatus and an image forming apparatus.

Some information processing apparatuses such as image forming apparatuses include display devices with rectangular shapes having long sides and short sides such that display screens of the display devices can be rotated to a portrait orientation and a landscape orientation. For example, an image forming apparatus that includes a display device with a rectangular shape having long sides and short sides and a rotation mechanism that causes the display device to rotate to a landscape orientation in which the long sides are located on upper and lower sides and a portrait orientation in which the short sides are located on the upper and lower sides is known. Moreover, an image forming apparatus that performs error display in a case in which an error occurs is also known.

SUMMARY

As an aspect of the present disclosure, a technology achieved by further improving the above technology will be proposed.

An information processing apparatus according to an aspect of the present disclosure includes a display device, a rotation mechanism, a detection sensor, and a control device. The display device has a rectangular shape having long sides and short sides. The rotation mechanism causes the display device to rotatable between a landscape orientation in which the long sides are located on upper and lower sides and a portrait orientation in which the short sides are located on the upper and lower sides. The detection sensor detects which of a landscape orientation and a portrait orientation the display device is in. The control device includes a processor and functions as a controller by the processor executing a control program. The controller displays an error screen including a concept image and a text indicating details of an error on the display device in a case of occurrence of the error. The controller arranges a first display region and a second display region on the error screen, and arranges the first display region and the second display region in horizontal arrangement in a case in which the detection sensor has detected the landscape orientation of the display device, or arranges the first display region and the second display region in vertical arrangement in a case in which the detection sensor has detected the portrait orientation of the display device.

An image forming apparatus according to an aspect of the present disclosure includes: the information processing apparatus according to the aspect of the present disclosure; and an image forming device. The image forming device forms an image on a recording medium. The controller causes the display device to display the error screen for an error related to an operation of the image forming device.

DETAILED DESCRIPTION

Figure 1:
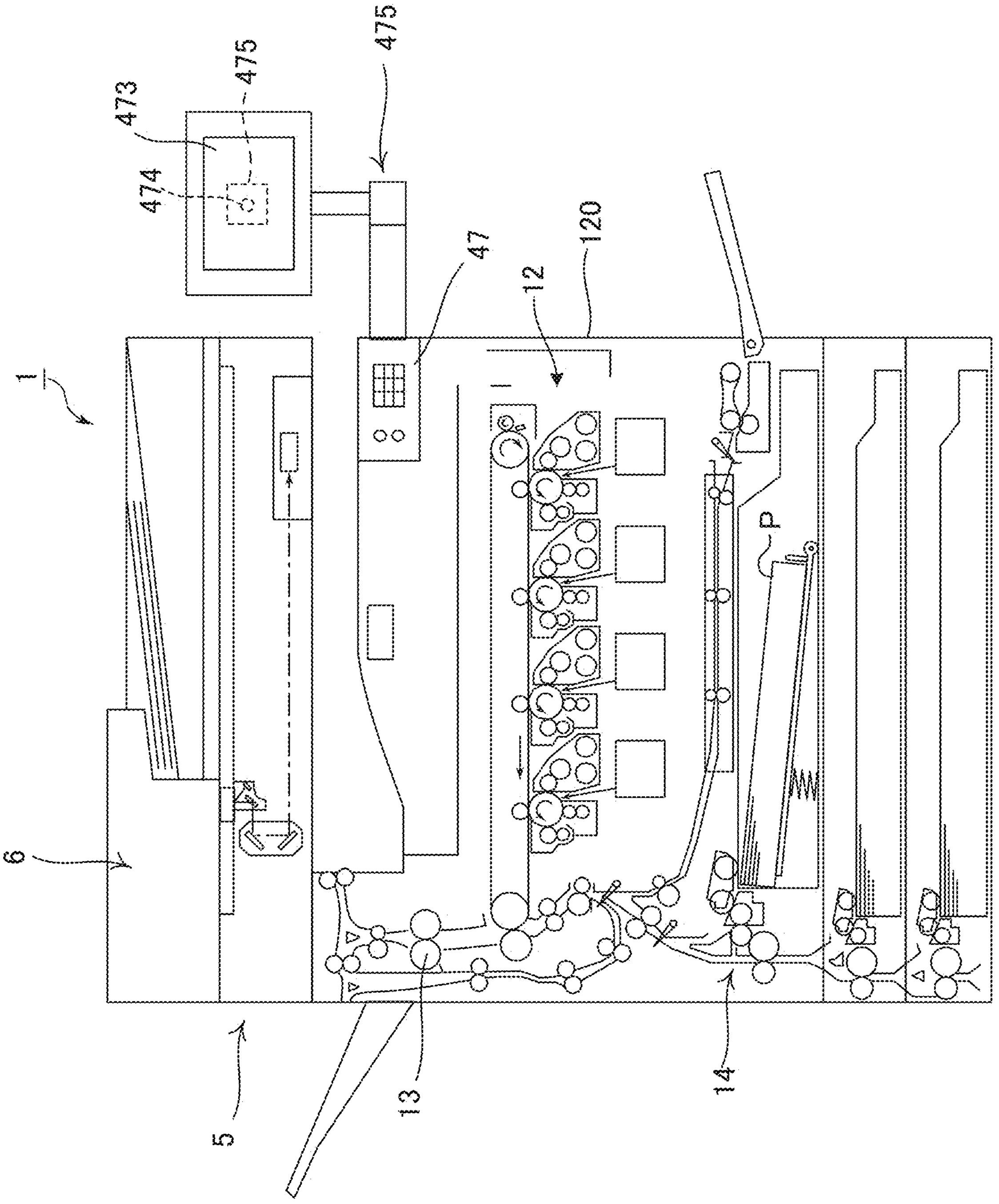
FIG. 1 is a front sectional view illustrating a structure of an image forming apparatus according to an embodiment of the present disclosure.
Figure 2:
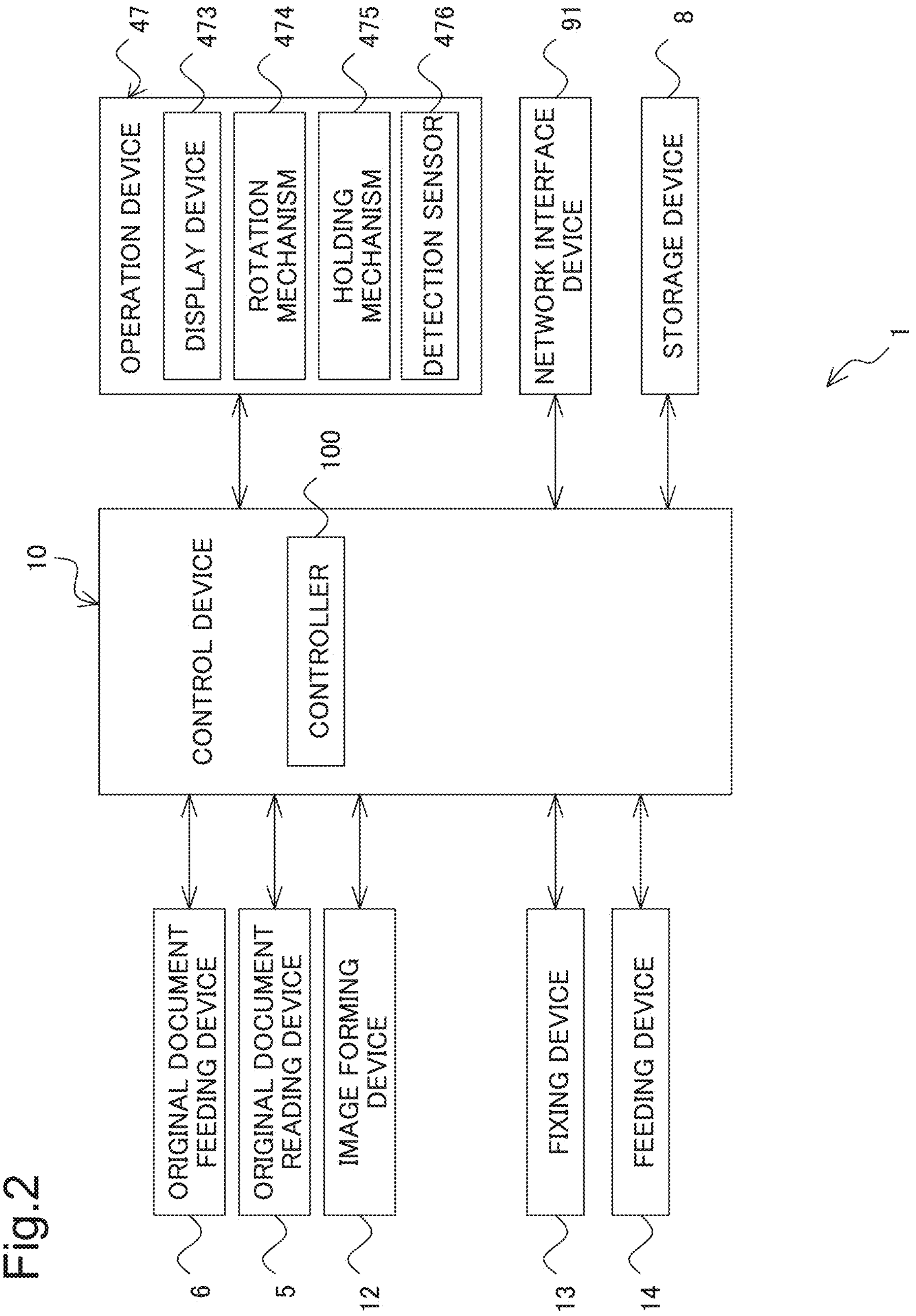
FIG. 2 is a functional block diagram schematically illustrating main internal configurations of the image forming apparatus according to the embodiment of the present disclosure.

Hereinafter, an information processing apparatus according to an embodiment of the present disclosure will be described with reference to the drawings. The information processing apparatus according to the embodiment of the present disclosure is, for example, an image forming apparatus. FIG. 1 is a front sectional view illustrating a structure of the image forming apparatus according to the embodiment of the present disclosure. FIG. 2 is a functional block diagram schematically illustrating main internal configurations of the image forming apparatus according to the embodiment of the present disclosure. Although left-right and up-down directions may be referred to below, these indicate directions in an example in each drawing unless otherwise particularly indicated.

An image forming apparatus 1 is a composite machine that has multiple functions such as a copy function, a printer function, a scanner function, and a facsimile function, for example. The image forming apparatus 1 is configured to include a control device 10, an original document feeding device 6, an original document reading device 5, an image forming device 12, a fixing device 13, a feeding device 14, an operation device 47, a network interface device 91, and a storage device 8.

The original document feeding device 6 is configured to be able to be opened and closed by a hinge or the like, which is not illustrated, above an upper surface of the original document reading device 5. The original document feeding device 6 functions as an original document pressing cover when the original document reading device 5 reads an original document placed on a platen glass, which is not illustrated. Also, the original document feeding device 6 is an auto document feeder (ADF), includes an original document placement tray, which is not illustrated, and feeds an original document placed on the original document placement tray to the original document reading device 5.

The original document reading device 5 includes a scanner or the like, and reads the original document read from the original document feeding device 6, or reads the original document placed on the platen glass.

A case in which the image forming apparatus 1 performs an original document reading operation will be described. The original document reading device 5 optically reads an image of the original document fed by the original document feeding device 6 to the original document reading device 5 or of the original document placed on the platen glass and generates image data. The image data generated by the original document reading device 5 is saved in an image memory or the like, which is not illustrated.

A case in which the image forming apparatus 1 performs an image forming operation will be described. The image forming device 12 is a mechanism including a photoreceptor drum, a charging device, an exposure device, a developing device, and a primary transfer device for each color and forming an image on recording paper through secondary transfer via an intermediate transfer belt. The image forming device 12 forms a toner image on recording paper as a recording medium fed from the feeding device 14 and creates a printed article on the basis of the image data generated through the original document reading operation, image data stored in an image memory or the like, image data received from a computer connected to a network, and the like. The feeding device 14 includes a paper feeding cassette and further includes a pick-up roller, a transport roller, a transport path, and a rotation driving mechanism for each roller that pick up recording paper from the paper feeding cassette and feed the recording paper to the image forming device 12.

The fixing device 13 is a fixing device including a heat roller, a pressure roller, and a driving mechanism that drives and rotates these rollers and adapted to heat and pressurize the recording paper with a toner image formed thereon by the image forming device 12 through nipping achieved by the above both rollers and fix the toner image on the recording paper, and the recording paper on which fixing processing has been performed is discharged to a discharge tray, which is not illustrated.

The operation device 47 includes various hard keys to be operated by a user and receives commands such as an image forming operation execution command from the user for various operations and processing that the image forming apparatus 1 can execute in response to operations of the hard keys.

The operation device 47 includes a display device 473 that displays operation guidance and the like for an operator, a rotation mechanism 474, a holding mechanism 475, and a detection sensor 476. Also, the operation device 47 receives inputs of commands from the user based on operations (touch operations) performed by the user on a screen displayed on the display device 473 via a touch panel included in the display device 473.

The display device 473 is a display with a rectangular shape having long sides and short sides and is made of a liquid crystal display (LCD) or the like. Once the operator performs an operation of touching a button or a key displayed on the screen, the touch panel receives a command associated with the position on which the touch operation has been performed. In this case, the touch panel functions as the operation device.

The holding mechanism 475 is a member with an arm shape with which the display device 473 is attached to an apparatus main body 120 of the image forming apparatus 1. The holding mechanism 475 supports the display device 473 such that the display device 473 is rotatable with respect to the holding mechanism 475, and temporarily fixes and holds the display device 473 in each of postures in a landscape orientation and a portrait orientation. The holding mechanism 475 includes an engagement portion made of a recessed portion provided at a position facing the display device 473 at each of the positions corresponding to a landscape orientation posture position and a portrait orientation posture position of the display device 473. A projecting portion to be fitted to the engagement portion is provided in a side surface of the display device 473 facing the holding mechanism 475. When the display device 43 is in the posture in the landscape orientation (FIGS. 3A and 3G) or the posture in the portrait orientation (FIG. 3D), the posture of the display device 473 is fixed and held by the recessed portion and the projecting portion fitted to each other.

The rotation mechanism 474 is interposed between the holding mechanism 475 and the display device 473. In other words, the holding mechanism 475 rotatably supports the display device 473 via the rotation mechanism 474. The rotation mechanism 474 includes a rotation shaft, and the rotation shaft is rotatably supported by the holding mechanism 475. The rotation shaft is attached to a rectangular center of the side surface of the display device 473 facing the holding mechanism 475 in a state in which the rotation shaft rotates along with the display device 473. A cam (which will be described later) that rotates along with the rotation shaft is provided in a peripheral surface of the rotation shaft.

Figures 3A, 3B, 3C, 3D, 3E, 3F, 3G:
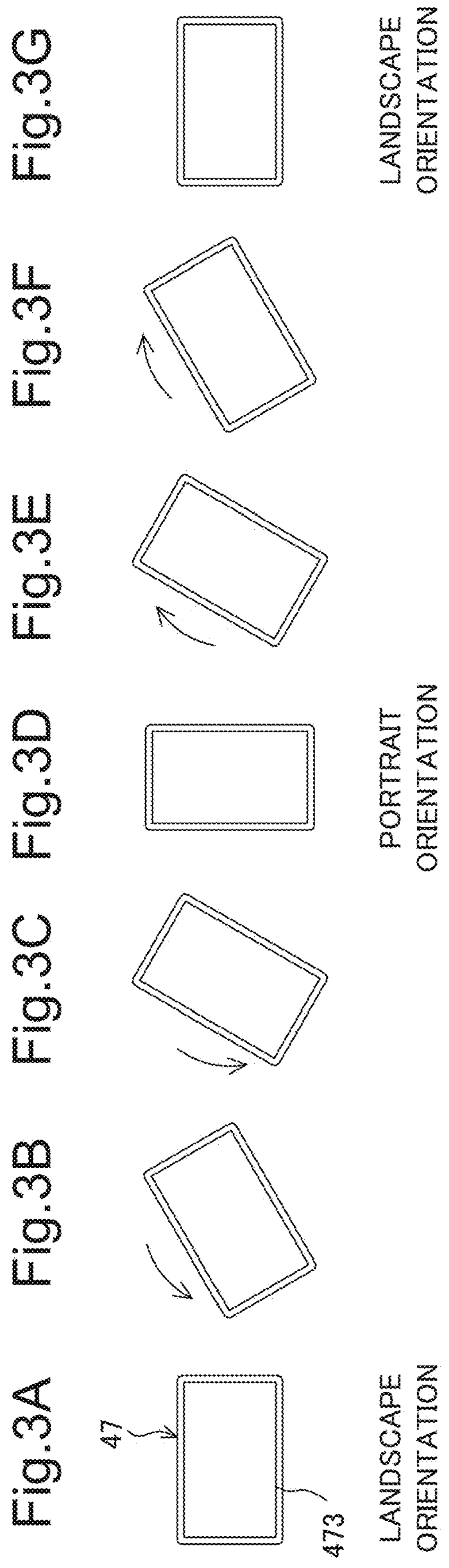
FIGS. 3A to 3G are diagrams for explaining an example of rotation of a display device.

FIGS. 3A to 3G are diagrams for explaining an example of rotation of the display device 473. The display device 473 in the landscape orientation illustrated in FIG. 3A rotates in the counterclockwise direction and is turned into the portrait orientation as illustrated in FIGS. 3B to 3D. Also, the display device 473 in the portrait orientation illustrated in FIG. 3D rotates in the clockwise direction and is turned into the landscape orientation as illustrated in FIGS. 3E to 3G.

In other words, the rotation mechanism 474 is configured to switch the display device 473 from the landscape orientation to the portrait orientation by causing the display device 473 to rotate in the counterclockwise direction in FIG. 3 when seen from the surface of the display device 473. Note that although a range of a rotation angle of the display device 473 is not limited to 90 degrees, a case in which the range of the rotation angle is 90 degrees is illustrated as an example here. However, the rotation direction of the display device 473 and the configuration to switch the display device 473 from the landscape orientation to the portrait orientation are not limited thereto, and the present embodiment is just an example.

The detection sensor 476 is a switch mechanism that detects the posture in the landscape orientation and the posture in the portrait orientation of the display device 473. The switch mechanism is provided at a position at which the switch mechanism is pressurized by a cam lobe (projecting portion) of the cam attached to the rotation shaft when the display device 473 is in the posture in the portrait orientation. The switch mechanism outputs an ON signal (Low signal) to the control device 10 when the switch mechanism is pressurized by the cam lobe. In other words, the switch mechanism is disposed at a position at which the switch mechanism is not pressurized by the cam lobe when the display device 473 is in a posture other than the posture in the portrait orientation.

As the configuration of the rotation mechanism 474 that switches the display device 473 from the landscape orientation to the portrait orientation by causing the display device 473 to rotate in the counterclockwise direction in FIG. 3 when seen from the front surface of the display device 473, a configuration in which entrance of the cam lobe into the switch mechanism is possible only when the display device 473 rotates in the counterclockwise direction and is not possible when the display device 473 rotates in the clockwise direction (providing a projecting portion that locks the cam lobe at an outer edge of the switch mechanism in an entrance path of the cam lobe into the switch mechanism in the clockwise direction or the like), for example, is employed.

Figure 4A:
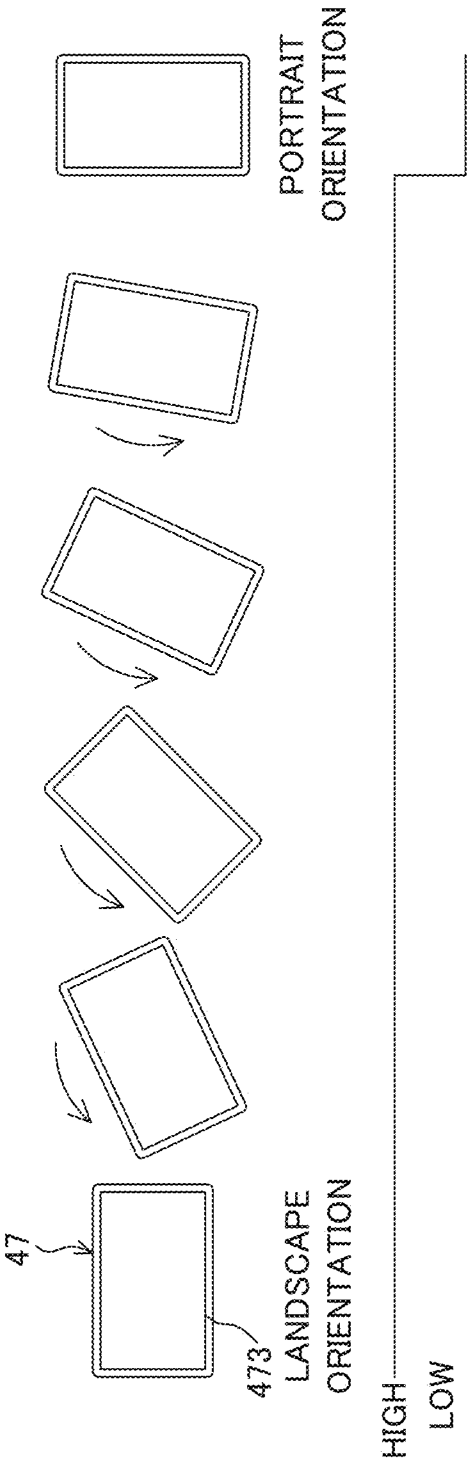
FIGS. 4A and 4B are diagrams for explaining a change in signal output from a detection sensor.
Figure 4B:
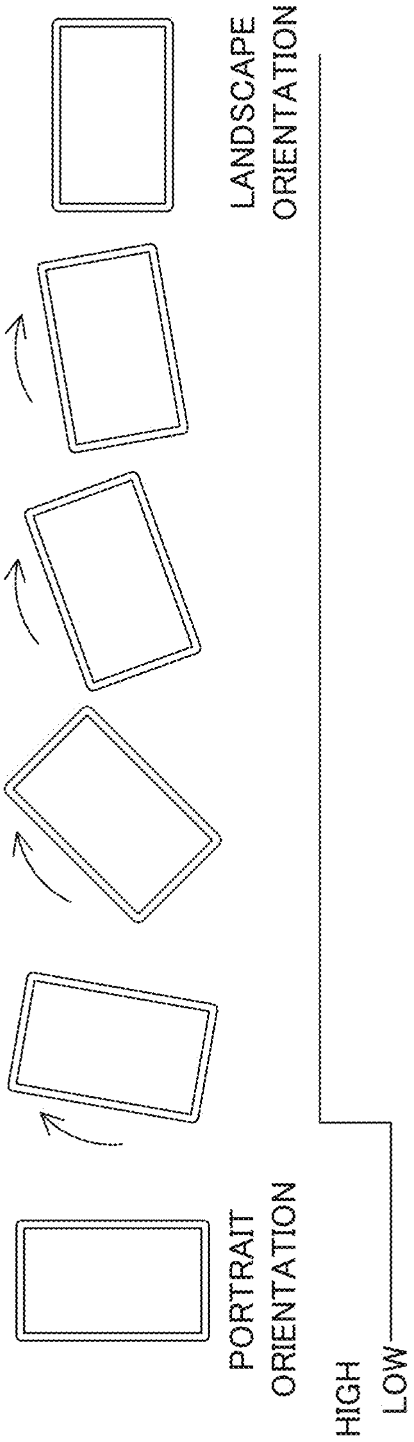

FIGS. 4A and 4B are diagrams for explaining a change in signal output from the detection sensor 476 provided at a position corresponding to the posture in the portrait orientation of the display device 473. As illustrated in FIGS. 4A and 4B, the detection sensor 476 provided at the position corresponding to the posture in the portrait orientation of the display device 473 outputs a Low signal to the control device 10 when the display device 473 is in the posture in the portrait orientation (when the switch mechanism is pressurized by the cam lobe) and outputs a High signal to the control device 10 in other cases (when the switch mechanism is not pressurized by the cam lobe).

Therefore, the detection sensor 476 outputs the Low signal to the control device 10 when the display device 473 is in the posture in the portrait orientation illustrated in FIG. 3D and outputs the High signal to the control device 10 when the display device 473 is in a posture other than the posture in the portrait orientation illustrated in FIG. 3D. In this manner, a controller 100, which will be described later, determines which of the posture in the portrait orientation and a posture other than the portrait orientation the display device 473 is in on the basis of the signal output from the detection sensor 476. Specifically, the controller 100 determines that the display device 473 is in the portrait orientation when the display device 473 is in the posture in the portrait orientation illustrated in FIG. 3D and determines that the display device 473 is in the landscape orientation when the display device 473 is in any other postures.

The network interface device 91 is a communication interface that transmits and receives various kinds of data to and from an external device (a PC, for example) in a local area or on the Internet.

The storage device 8 is a large-capacity storage device such as a hard disk drive (HDD) or a solid state drive (SSD) and stores various control programs and the like.

The control device 10 is configured to include a processor, a random access memory (RAM), a read only memory (ROM), and a dedicated hardware circuit. The processor is, for example, a central processing unit (CPU), an application specific integrated circuit (ASIC), or a micro processing unit (MPU). The control device 10 includes the controller 100.

The control device 10 functions as the controller 100 through operations performed by the processor in accordance with the control programs stored in the storage device 8. However, the controller 100 can also be configured of each hardware circuit without depending on operations of the control device 10 in accordance with the control program. Hereinafter, the same applies to each embodiment unless otherwise particularly mentioned.

The controller 100 is in charge of overall operation control of the image forming apparatus 1. The controller 100 is connected to the original document feeding device 6, the original document reading device 5, the image forming device 12, the fixing device 13, the feeding device 14, the operation device 47, the network interface device 91, and the storage device 8 and performs drive control and the like of these components. For example, the controller 100 executes various kinds of processing and the like needed by the image forming apparatus 1 to form an image.

Figure 5:
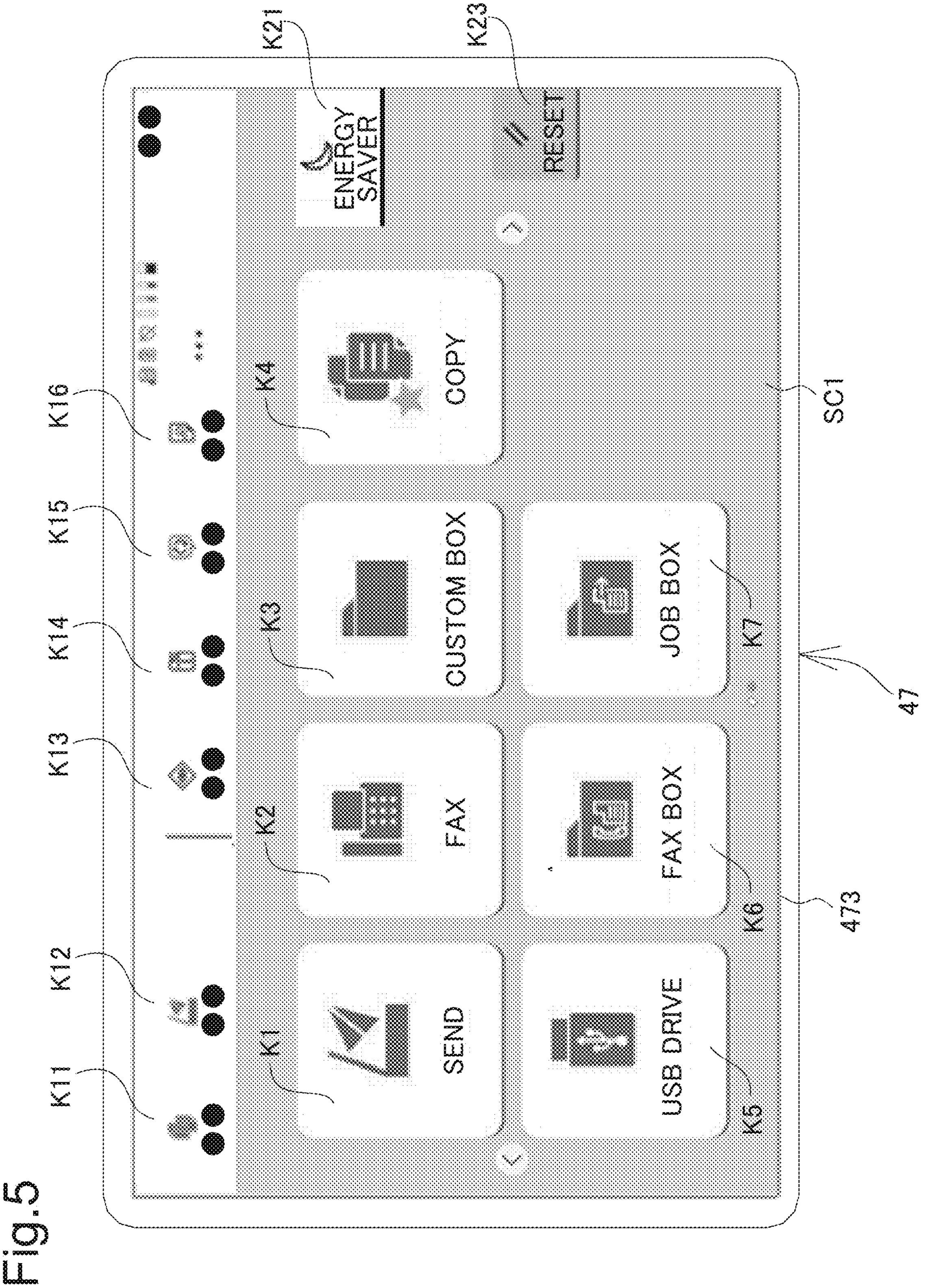
FIG. 5 is a diagram illustrating an example of a screen displayed on the display device.

Also, the controller 100 performs display control for the display device 473. For example, the controller 100 causes the display device 473 to display an operation screen SC1 as illustrated in an example of FIG. 5 as a "home screen". Operation keys K1 to K7 called "application icons" or the like are arranged in the operation screen SC1. For example, the operation key K4 is an icon in which a character sequence "Copy" is described and a pictorial pattern for "copy" are expressed. Also, operation keys K11 to K16 called "task icons" are arranged at the upper end in the operation screen SC1, and operation keys K21 and K23 are arranged at the right end.

The controller 100 performs control based on a command received by the operation device 47. For example, once the operation device 47 receives a command on the operation key K4 via the touch panel, the controller 100 performs display control for the display device 473 in response to the command and causes the operation screen displayed on the display device 473 to transition from the "home screen" to a "copy screen" as illustrated in an example in FIG. 6.

The controller 100 performs display in accordance with the posture of the display device 473 on the display device 473 on the basis of a detection result obtained by the detection sensor 476. Specifically, the controller 100 controls the display device 473 on the basis of the detection signal output from the detection sensor 476 and causes the display device 473 to display a screen in accordance with the posture of the display device 473. If the detection sensor 476 detects switching of the display device 473 from the landscape orientation to the portrait orientation when an operation screen SC2 illustrated in FIG. 6 is displayed on the display device 473, for example, the controller 100 causes the screen displayed on the display device 473 to transition from the operation screen SC2 (FIG. 6) to an operation screen SC3 as illustrated in an example in FIG. 7.

Figure 6:
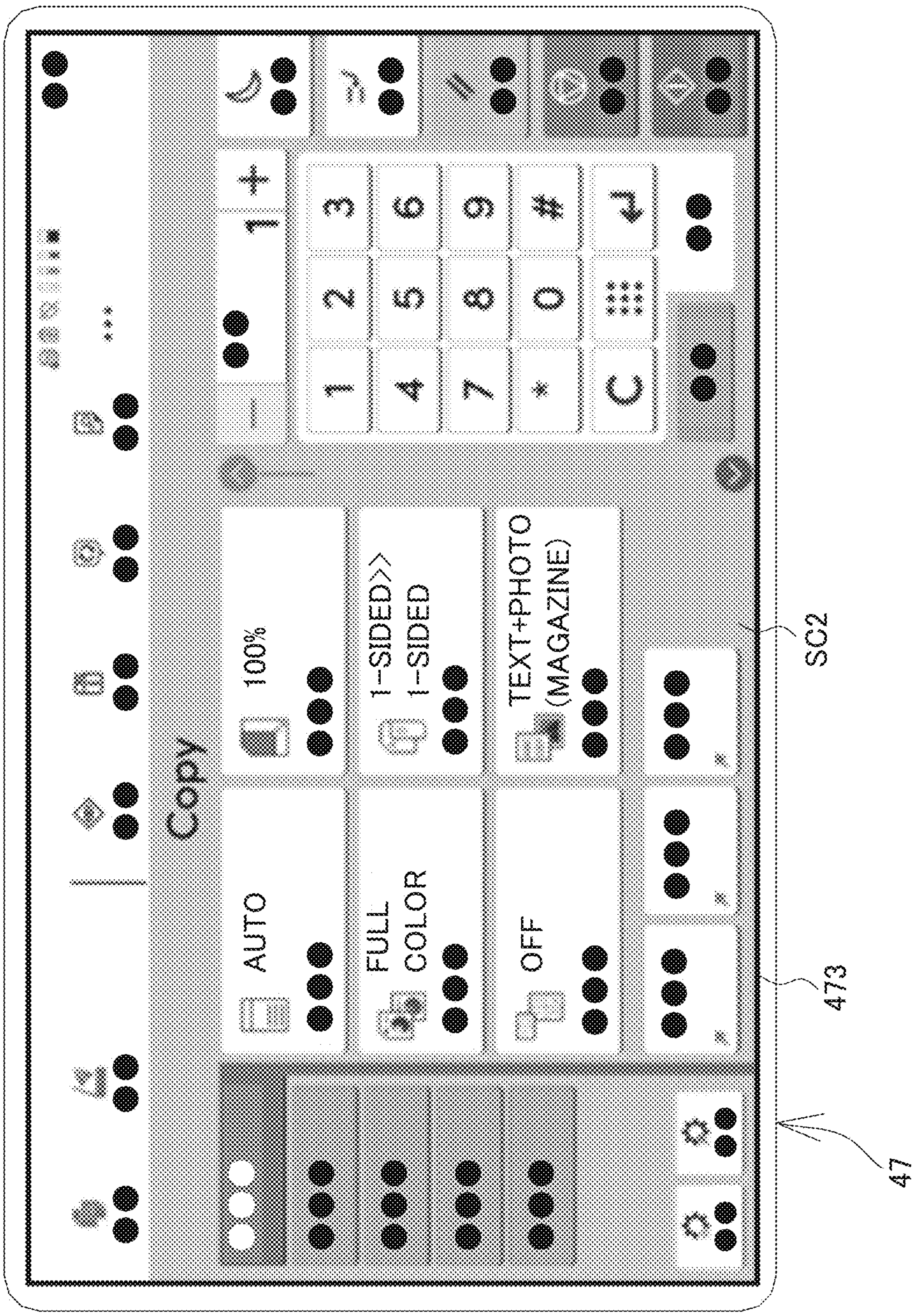
FIG. 6 is a diagram illustrating an example of a screen displayed on the display device.
Figure 7:
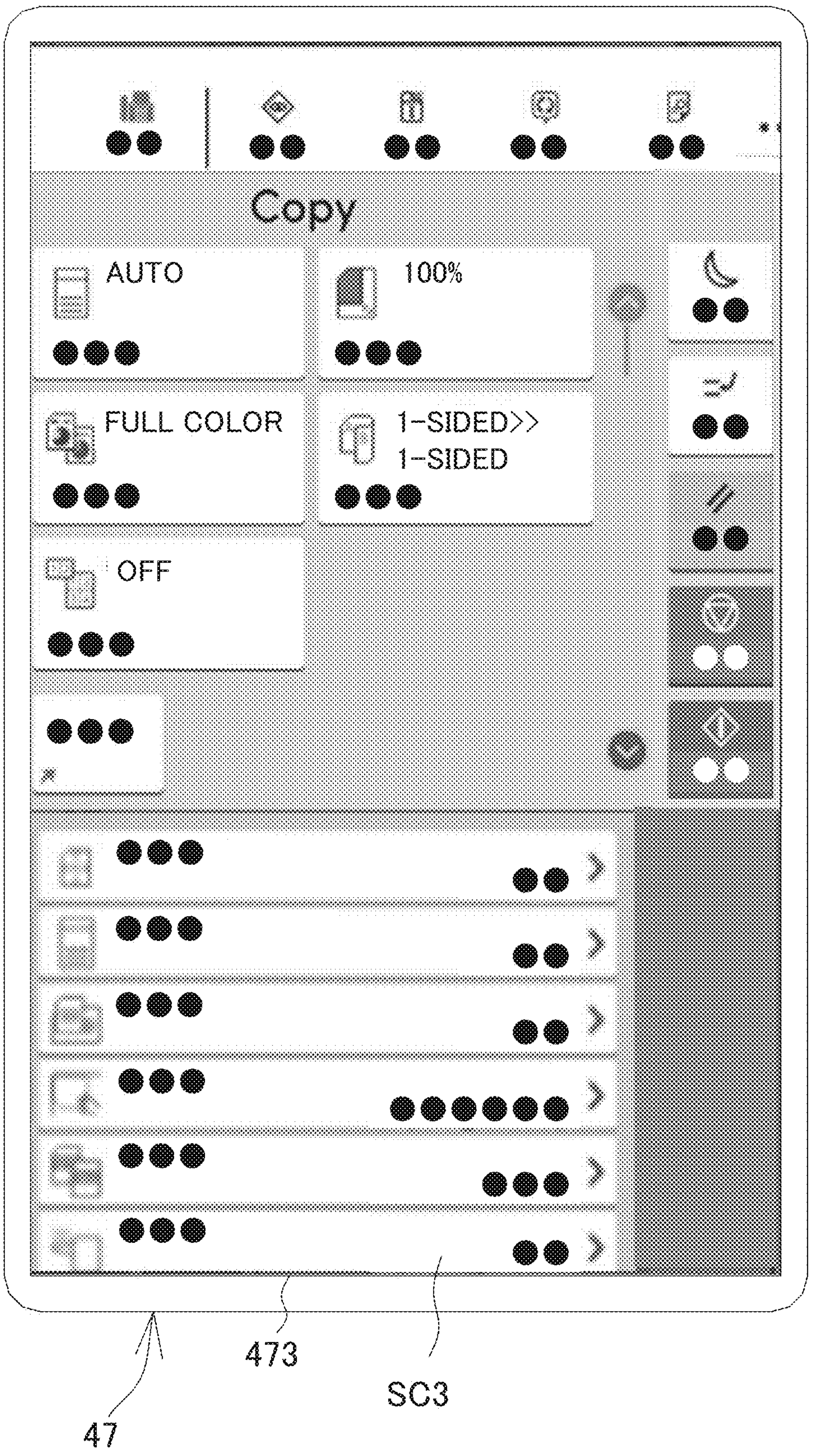
FIG. 7 is a diagram illustrating an example of a screen displayed on the display screen.

On the contrary, if the detection sensor 476 detects switching of the display device 473 from the portrait orientation to the landscape orientation when the operation screen SC3 illustrated in FIG. 7 is displayed on the display device 473, the controller 100 causes the screen displayed on the display device 473 to transition from the operation screen SC3 (FIG. 7) to the operation screen SC2 (FIG. 6).

The controller 100 detects occurrence of errors such as paper clogging, running-out of toner, and an apparatus failure on the basis of output signals acquired from various sensors (not illustrated) provided at locations inside the image forming apparatus 1. For example, the controller 100 detects that an error has occurred (i) in a case in which an output signal at the time of transport of recording paper from a paper presence/absence detection sensor provided inside the image forming apparatus 1 and installed in a recording paper transport path maintains a state indicating presence of paper only for a prescribed specific period of time, (ii) in a case in which an output signal from a toner empty sensor indicates absence of toner, (iii) in a case in which an output signal from a door opening/closing detection sensor provided in the apparatus main body indicates that the door is open, and the like. Furthermore, the controller 100 detects occurrence of an error related to the image forming operation of the image forming device 12 or specifies details of the occurring error on the basis of details of the output signals from various sensors.

Also, the storage device 8 stores information (concept image data and text data, for example) necessary to create an error screen in accordance with the details of the occurring error in advance. The controller 100 acquires the information necessary to create the error screen from the storage device 8 in accordance with the details of the occurring error, creates the error screen on the basis of the acquired information, and causes the display device 473 to display the created error screen.

Figure 8A:
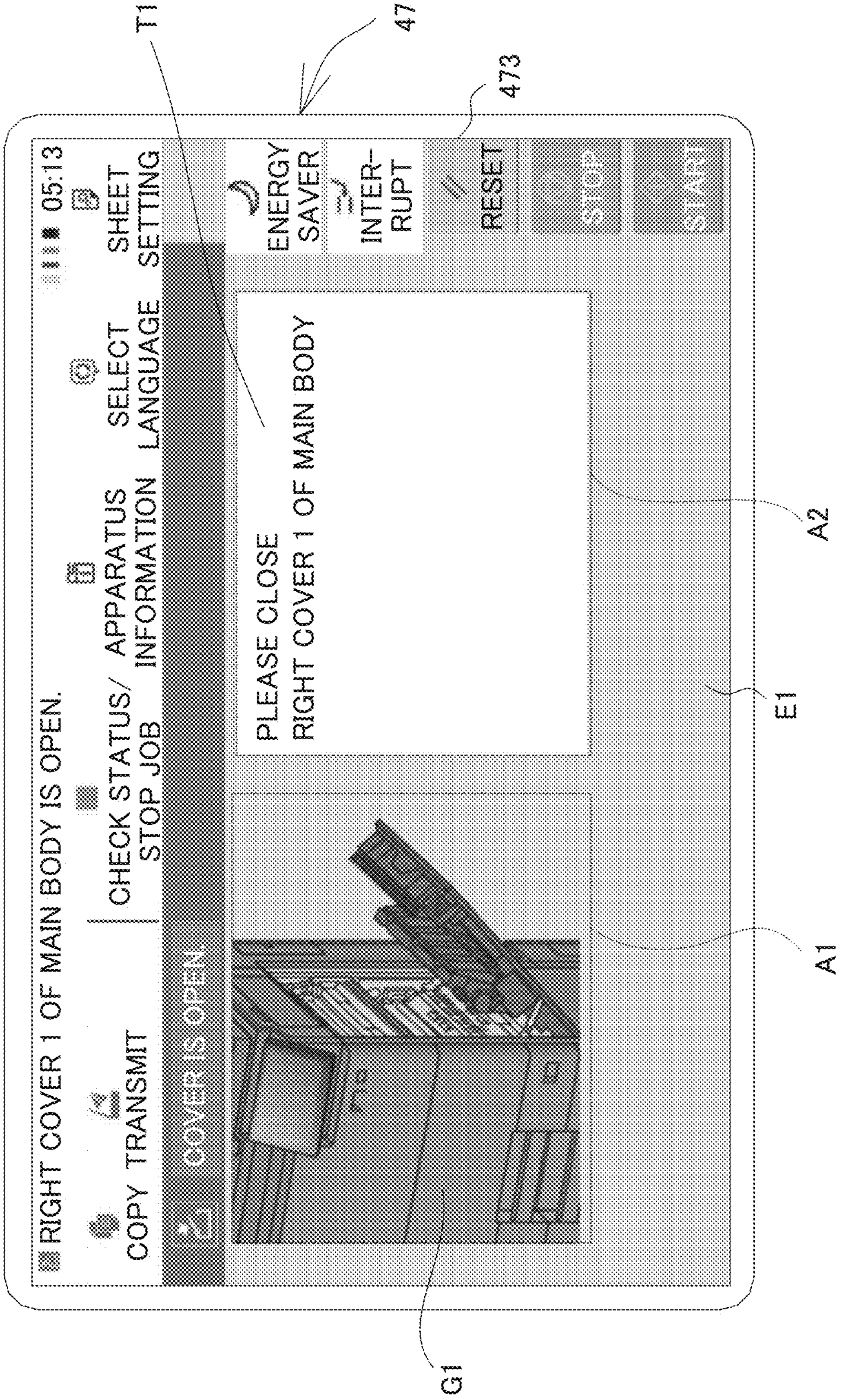
FIGS. 8A and 8B are diagrams illustrating an example of screens displayed on the display device.
Figure 8B:
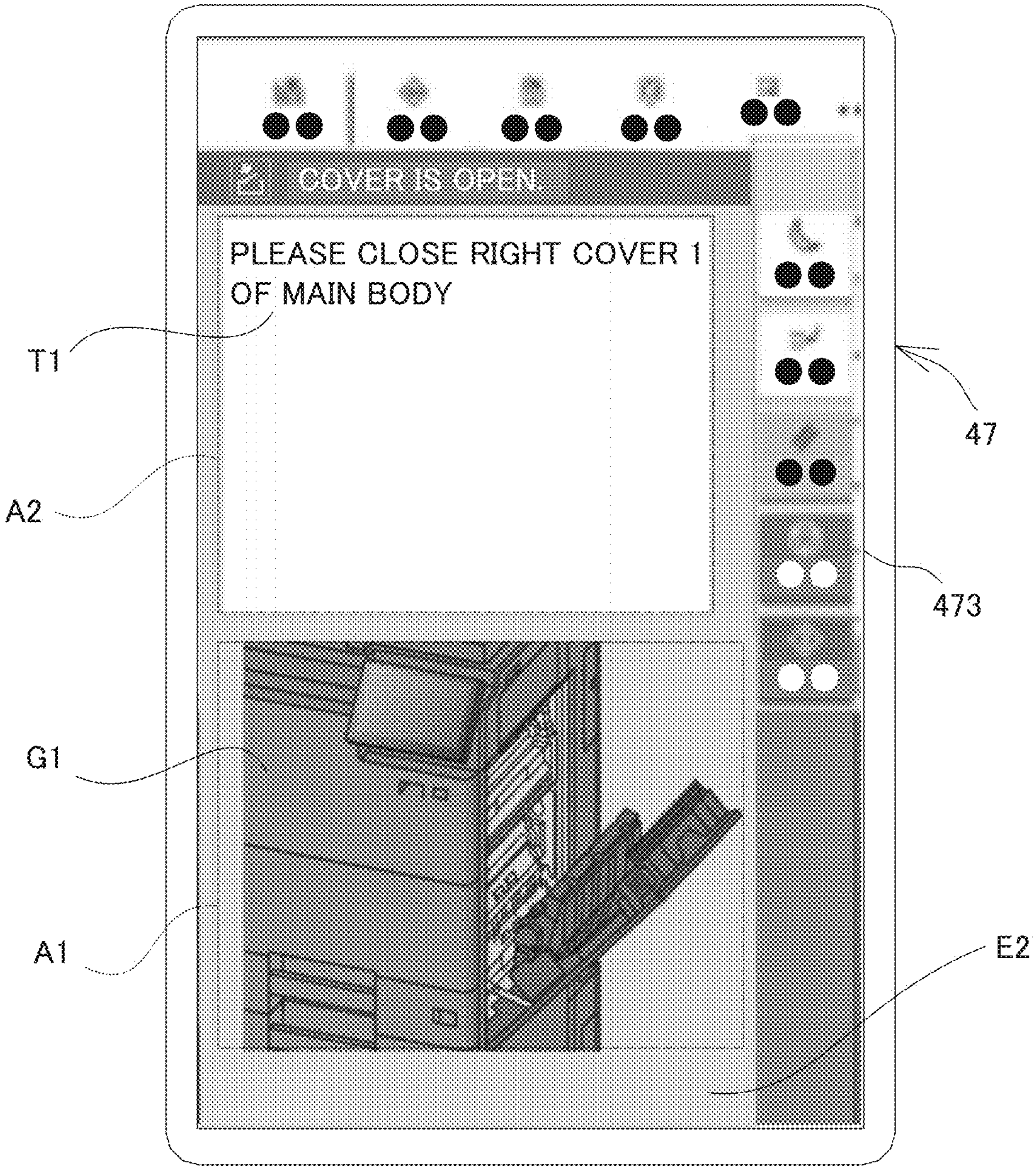

FIGS. 8A and 8B are diagrams illustrating an example of error screens displayed on the display device 473. A concept image display region A1 (the region surrounded by the broken line) to display a concept image and a text display region A2 (the region surrounded by the broken line) to display a text are arranged in error screens E1 and E2 illustrated in FIGS. 8A and 8B, a concept image G1 is displayed in the concept image display region A1, and a text T1 is displayed in the text display region A2.

An aspect ratio of the error screen E1 is defined to be displayed on the display device 473 in the posture in the landscape orientation. The concept image display region A1 and the text display region A2 are arranged in horizontal arrangement in the error screen E1, and the sizes of the concept image display region A1 and the text display region A2 are set to sizes with which the concept image display region A1 and the text display region A2 can be displayed in the maximum sizes in the horizontally long display available region on the display device 473 in the landscape orientation. The text display region A2 is arranged on the right side of the concept image display region A1 in the error screen E1 in an example.

On the other hand, an aspect ratio of the error screen E2 is defined to be displayed on the display device 473 in the posture in the portrait orientation. The concept image display region A1 and the text display region A2 are arranged in vertical arrangement in the error screen E2, and the sizes of the concept image display region A1 and the text display region A2 are set to sizes with which the concept image display region A1 and the text display region A2 can be displayed with the maximum sizes in the vertically long display available region on the display device 473 in the portrait orientation. The text display region A2 is arranged on the upper side of the concept image display region A1 in the error screen E2 in an example.

Figure 9:
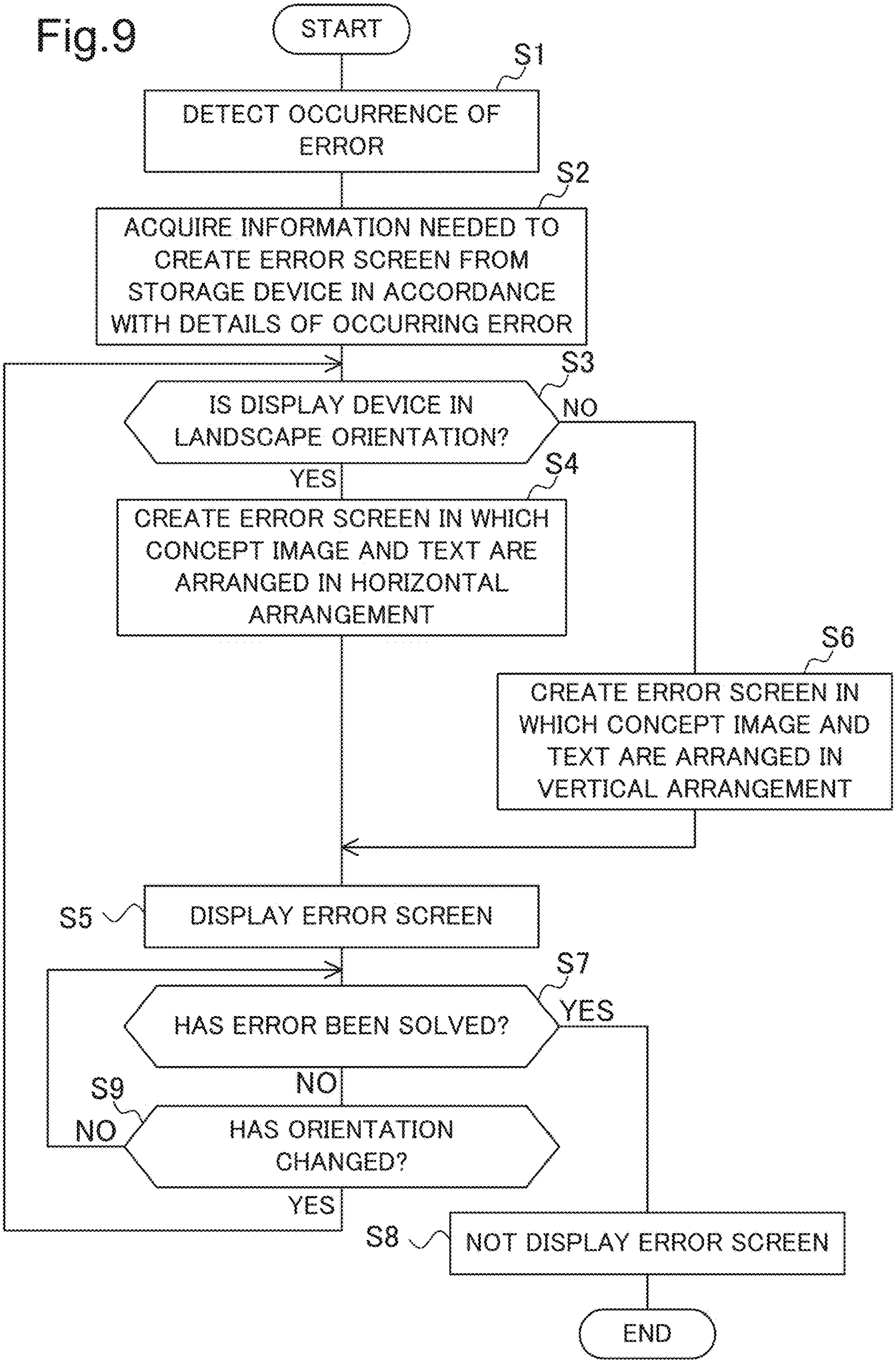
FIG. 9 is a flowchart illustrating an example of processing related to display control associated with a change in posture of the display device performed by a controller.

Next, an example of processing performed by the controller 100 in relation to display control associated with a change in posture of the display device will be described using the flowchart illustrated in FIG. 9.

In a case in which occurrence of an error is detected on the basis of output signals acquired from the various sensors (S1), the controller 100 acquires information (concept image data and text data, for example) necessary to create the error screen from the storage device 8 in accordance with details of the occurring error (S2). Then, the controller 100 determines whether or not the display device 473 is in the portrait orientation on the basis of a signal from the detection sensor 476 (S3).

In a case in which the controller 100 determines that the display device 473 is not in the portrait orientation, that is, the display device 473 is in the landscape orientation (YES in S3), the controller 100 creates an error screen E1 for landscape orientation display of the display device 473 in which the concept image G1 and the text T1 are arranged in horizontal arrangement as illustrated in FIG. 8A (S4) and causes the display device 473 to display the created error screen E1 (S5).

On the other hand, in a case in which the controller 100 determines that the display device 473 is in the portrait orientation (NO in S3), the controller 100 creates an error screen E2 in which the concept image G1 and the text T1 are arrange in vertical arrangement as illustrated in FIG. 8B and causes the display device 473 to display the created error screen E2 (S5).

Subsequently, the controller 100 determines whether or not the occurring error has been solved on the basis of output signals acquired from the various sensors (S7). In a case in which the controller 100 determines that the error has been solved (YES in S7), the controller 100 turns the error screen E1 or E2 that the display device 473 is caused to display into a non-displayed state at this timing (S8). Then the processing ends.

On the other hand, in a case in which the controller 100 determines that the error has not been solved (NO in S7), the controller 100 determines whether or not the posture of the display device 473 has been switched on the basis of an output signal from the detection sensor 476 (S9).

In a case in which the controller 100 determines that the posture of the display device 473 has been switched (YES in S9), the processing returns to S3. Then, the controller 100 performs the processing in and after S3 to display the error screen in accordance with the posture of the display device 473 on the display device 473. On the other hand, in a case in which the controller 100 determines that the posture of the display device 473 has not been switched (NO in S9), the processing returns to S7.

According to the above embodiment, the concept image display region A1 and the text display region A2 are arranged in horizontal arrangement in the case in which the display device 473 is in the landscape orientation, the concept image display region A1 and the text display region A2 are arranged in vertical arrangement in the case in which the display device 473 is in the portrait orientation, and it is thus possible to reduce a reduction rate at the time of changing the size of the display screen assuming display on the display device 473 in the landscape orientation to the size for the portrait orientation display. For example, it is not necessary to reduce the size of the error display assuming the display on the display device in the landscape orientation in accordance with the lateral width of the display region at the time of the portrait orientation with the aspect ratio maintained and to represent the error display after the size reduction. Therefore, it is possible to present the details of the error display such that the user readily recognizes the details from the display even when the posture of the display device 473 is switched from the landscape orientation to the portrait orientation.

Incidentally, since the display device 473 rotates in the counterclockwise direction in a front view to the front surface, and the posture is switched from the landscape orientation to the portrait orientation, discontinuity occurs between display of the concept image G1 and display of the text image T1, and an unnatural feeling is given to the user in a case in which the posture of the display device 473 is switched if the display region (the text display region A2) to be arranged on the right side in the horizontal arrangement when the front surface of the display device 473 is seen from the front out of the concept image display region A1 and the text display region A2 is arranged on the lower side in the vertical arrangement.

However, since the display region (text display region A2) to be arranged on the right side in the horizontal arrangement out of the concept image display region A1 and the text display region A2 is arranged on the upper side in the vertical arrangement, and continuity between the display of the concept image G1 and the display of the text T1 is thus maintained even if the posture of the display device 473 is switched in the above embodiment, it is possible to avoid occurrence of the unnatural feeling.

Note that when a configuration in which the rotation mechanism 474 switches the display device 473 from the landscape orientation to the portrait orientation by causing the display device 473 to rotate in the clockwise direction when seen from the front surface of the display device 473 is employed unlike the above embodiment, the controller 100 arranges the display region (concept image display region A1) to be arranged on the left side in the horizontal arrangement when the front surface of the display device 473 is seen from the front on the upper side out of the concept image display region A1 and the text display region A2 on the upper side in the vertical arrangement. In this manner, it is possible to maintain continuity between the display of the concept image G1 and the display of the text T1 at the time of the switching of the posture of the display device 473 regardless of the change in configuration of the rotation mechanism 474.

Also, in a case in which the rotation mechanism 474 includes a mechanism of causing the front surface of the display device 473 to rotate in both the counterclockwise direction and the clockwise direction, the controller 100 arranges the display region (text display region A2) to be arranged on the right side in the horizontal arrangement out of the concept image display region A1 and the text display region A2 on the upper side in the vertical arrangement when the display device 473 rotates in the counterclockwise direction, and the controller 100 arranges the display region (concept image display region A1) to be arranged on the left side in the horizontal arrangement out of the concept image display region A1 and the text display region A2 on the upper side in the vertical arrangement when the display device 473 rotates in the clockwise direction.

As the configuration of the rotation mechanism 474 to switch the display device 473 from the landscape orientation to the portrait orientation by rotating the display device 473 in the clockwise direction in FIG. 3 when seen from the front surface of the display device 473, a configuration in which entrance of the cam lobe into the switch mechanism is possible only when the display device 473 rotates in the clockwise direction and is not possible when the display device 473 rotates in the counterclockwise direction (such as a configuration in which a projecting portion that locks the cam lob is provided in the entrance path of the cam lobe into the switch mechanism from the counterclockwise direction at the outer edge of the switch mechanism) is employed, for example.

The present disclosure is not limited to the configuration of the above embodiment, and various modifications can be made. Although the controller 100 causes the display device 473 to display the concept image display region as the first display region and causes the display device 473 to display the text display region as the second display region in the above embodiment, for example, the present disclosure is not limited thereto, and the controller 100 may cause the display device 473 to display the concept image display region in both the first display region and the second display region, display the text display region in both the first display region and the second display region, or display the text display region in the first display region and the concept image display region in the second display region.

An information processing apparatus according to an embodiment of the present disclosure is a personal computer, for example, and includes at least the operation device 47, the display device 473, the rotation mechanism 474, the detection sensor 476, and the controller 100. In the information processing apparatus according to the embodiment of the present disclosure, the image forming device 12 is not an essential configuration. In the information processing apparatus according to the embodiment of the present disclosure, the controller 100 performs the aforementioned display control performed by the controller 100 in association with a change in posture of the display device 473 even in a case in which the controller 100 causes the display device 473 to display image data stored in an incorporated memory or HDD, for example. In this case, it is a matter of course that the aforementioned processing related to image formation is not performed.

In this case, a document box as a storage region is included in the storage device 8 in the image forming apparatus 1, and when image data that is a target of display on the display device 473 is stored in the document box, the controller 100 also performs the aforementioned display control performed by the controller 100 in association with a change in posture of the display device 473 even when the display device 473 is caused to display the image data.

Display devices included in typical image forming apparatuses that are not related to the above embodiments are often in the landscape orientation, and display screen assuming display devices in the landscape orientation are typically displayed for error display as well. However, if the size of the error display assuming display on the display device in the landscape orientation is reduced in accordance with the lateral width of the display region at the time of the portrait orientation with the aspect ratio maintained, and the error display is displayed when the posture of the display device is switched from the landscape orientation to the portrait orientation, it becomes difficult for the user to view the details of the error display.

On the other hand, according to the above embodiments, display that allows the user to easily recognize the details of the error display is presented even if the display device 473 is rotatable and the posture is switched from the landscape orientation to the portrait orientation.

In the embodiments, the configurations and the processing illustrated in the above embodiments using FIGS. 1 to 9 are just embodiments of the present disclosure, and the present disclosure is not intended to be limited to the configurations and processing.

While the present disclosure has been described in detail with reference to the embodiments thereof, it would be apparent to those skilled in the art that the various changes and modifications may be made therein within the scope defined by the appended claims.

What is claimed is:

1. An information processing apparatus comprising:

a display device with a rectangular shape having long sides and short sides;

a rotation mechanism that causes the display device to be rotatable between a landscape orientation in which the long sides are located on upper and lower sides and a portrait orientation in which the short sides are located on the upper and lower sides;

a detection sensor that detects which of a landscape orientation and a portrait orientation the display device is in; and a control device that includes a processor and functions as a controller that displays an error screen including a concept image and a text indicating details of an error on the display device in a case of occurrence of the error by the processor executing a control program, wherein the controller arranges a first display region and a second display region on the error screen, and arranges the first display region and the second display region in horizontal arrangement in a case in which the detection sensor has detected the landscape orientation of the display device, or arranges the first display region and the second display region in vertical arrangement in a case in which the detection sensor has detected the portrait orientation of the display device, wherein the information processing apparatus further comprises a storage device that stores the concept image and the text corresponding to contents of the error, the controller acquires, from the storage device, the concept image and the text corresponding to the occurred error, and creates the error screen by causing the acquired concept image to be included in the first display region and by causing the acquired text to be included in the second display region, when the error has been solved, the controller turns the error screen being displayed on the display device into a non-displayed state, and when the error has not been solved and a change in posture of the display device is detected by the detection sensor, the controller recreates the error screen in a layout corresponding to the changed posture and causes the display device to display the recreated error screen.

2. The information processing apparatus according to claim 1, wherein a configuration in which the display device is switched from the landscape orientation to the portrait orientation by the rotation mechanism causing the display device to rotate in a counterclockwise direction in a front view to a front surface of the display device is employed, and the controller arranges, out of the first display region and the second display region, a display region that is arranged on a right side in the horizontal arrangement when the surface of the display device is seen from front on a side further upward than the other display region in the vertical arrangement.

3. The information processing apparatus according to claim 1, wherein a configuration in which the display device is switched from the landscape orientation to the portrait orientation by the rotation mechanism causing the display device to rotate in a clockwise direction in a front view to a front surface of the display device is employed, and the controller arranges, out of the first display region and the second display region, a display region that is arranged on a left side in the horizontal arrangement when the surface of the display device is seen from front on a side further upward than the other display region in the vertical arrangement.

4. The information processing apparatus according to claim 1, wherein a configuration in which the display device is switched from the landscape orientation to the portrait orientation by the rotation mechanism causing the display device to rotate in a counterclockwise direction in a front view to a front surface of the display device and a configuration in which the display device is switched from the landscape orientation to the portrait orientation by the rotation mechanism causing the display device to rotate in a clockwise direction in a front view to the front surface of the display device are employed, and the controller arranges, out of the first display region and the second display region, a display region that is arranged on a right side in the horizontal arrangement when the surface of the display device is seen from front on a side further upward than the other display region in the vertical arrangement, when the display device rotates in the counterclockwise direction, or arranges, out of the first display region and the second display region, a display region that is arranged on a left side in the horizontal arrangement when the surface of the display device is seen from the front on a side further upward than the other display region in the vertical arrangement when the display device rotates in the clockwise direction.

5. An image forming apparatus comprising:

the information processing apparatus according to claim 1; and an image forming device that forms an image on a recording medium, wherein the controller causes the display device to display the error screen for an error related to an operation of the image forming device.

6. The information processing apparatus according to claim 1, wherein the controller, when the display device is in the landscape orientation, sets sizes of the first display region and the second display region such that the first display region and the second display region can be displayed in the maximum sizes within a displayable area of the display device in the landscape orientation, and the controller, when the display device is in the portrait orientation, sets sizes of the first display region and the second display region such that the first display region and the second display region can be displayed in the maximum sizes within a displayable area of the display device in the portrait orientation.

* * * * *